Dec. 23, 1958 E. J. POITRAS ET AL 2,865,207
GYRO-VERTICAL ELEMENT
Filed Sept. 20, 1952 3 Sheets-Sheet 3
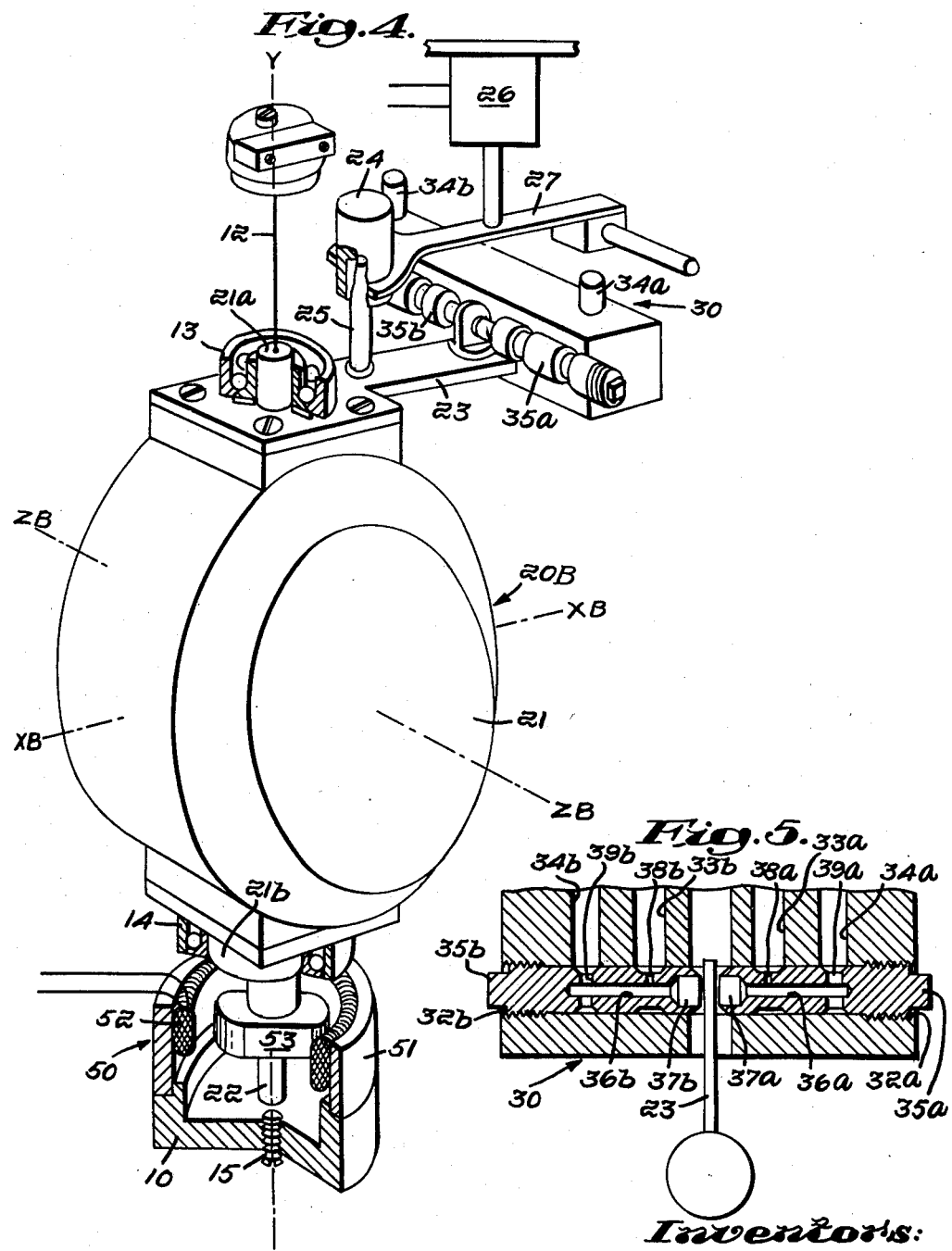

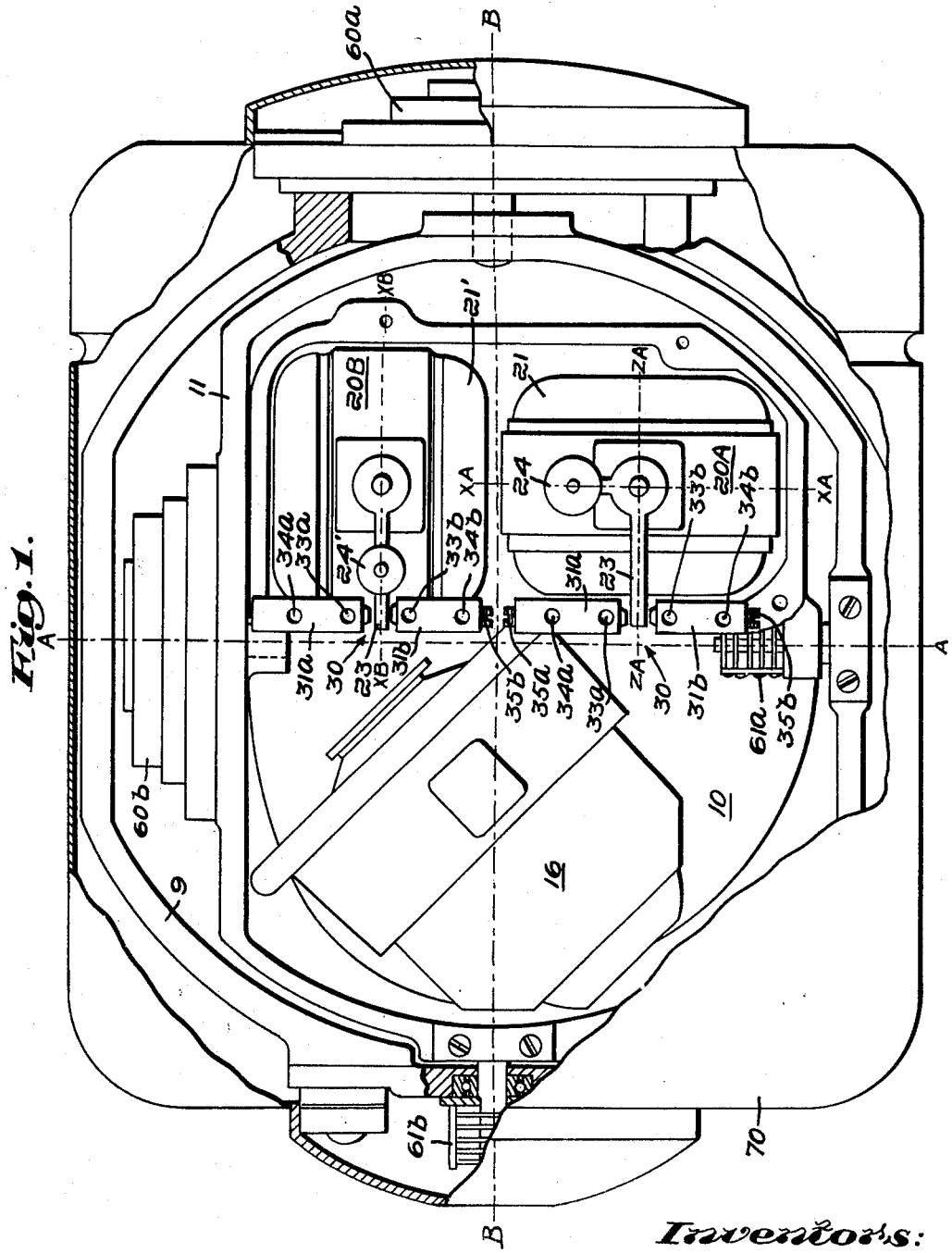

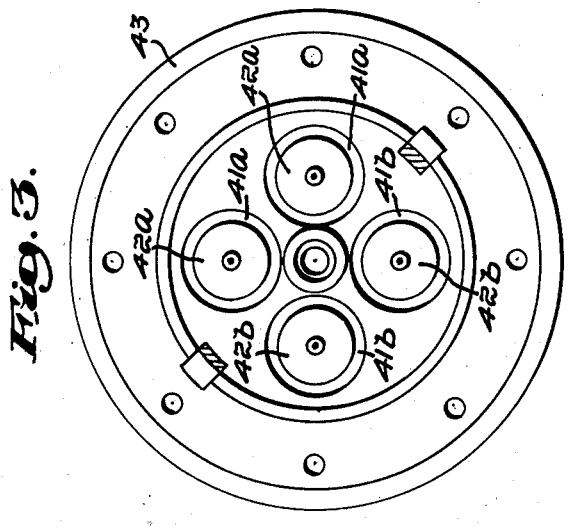
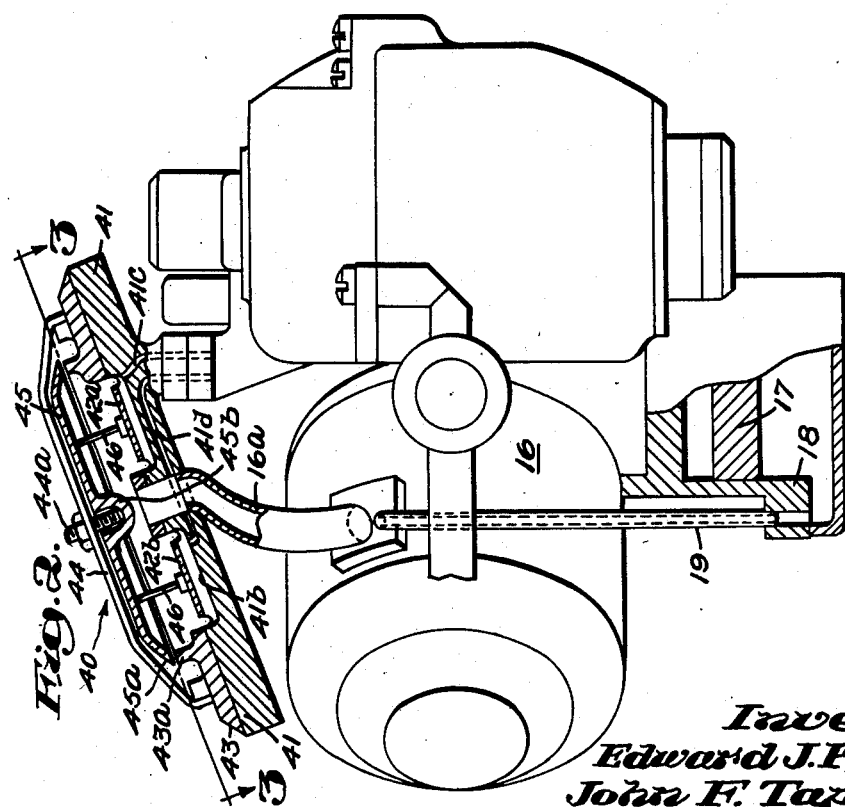

2,865,207
GYRO-VERTICAL ELEMENT

Edward J. Poitras, Holliston, and John F. Taplin, West Newton, Mass.

Application September 20, 1952, Serial No. 310,628

31 Claims. (Cl. 74—5.34)

The present invention relates generally to apparatus providing an artificial horizon or vertical, and more particularly to a gyroscopic device for indicating angular inclination of a movable body from a truly horizontal position as measured about two perpendicular axes.

Stable elements have heretofore employed a single gyroscope arranged for freedom of movement about two mutually perpendicular gimbal axes. In such conventional apparatus, the inertia of the gyroscope is used directly to obtain the stable reference in space. More particularly, the angular position of the gyroscope is compared with the position of pendulums swinging one about each gimbal axis, and torques are applied to precess the gyroscope toward coincidence with the pendulums.

Stable elements of this class are known to be subject to various external and also internal influences or forces which produce false or spurious torques, causing in part steady state and in part variable errors between the gyro and the pendulums. In general, the largest single source of error in such prior stable elements is shift of the gyro along the inner gimbal axis, which produces a spurious torque about the outer gimbal axis and directly on the gyro.

By the present invention there is provided a new and improved gyro vertical element or stable element in which gyroscopic inertia is relied on only indirectly to provide the stable reference in space. In other words, the horizon or vertical defining means of the invention is primarily non-gyroscopic in character, and, although subject to pendulous and gyroscopic control, is substantially free from the errors heretofore associated and experienced with devices of the type described. The apparatus of the invention is thus uniquely characterized by a capacity for nulling drift or angular velocity of the artificial horizon or vertical resulting from such errors or spurious torques as may result for example from friction in the gimbal bearings, or from unbalance of the stable element parts, or from motion of the ambient air.

The invention further provides an horizon defining mass or reference platform which is both non-pendulous and non-gyroscopic. In other words, it is statically balanced on a universal support, and it comprises in part gyroscopic means the sum of whose momentum is substantially zero. Moreover it is erected by a torque unit which is sensitive, frictionless, and unaffected by the attitude of the stable element carrying body or support, whereby the period and character of its settling is advantageously long and non-oscillating, and whereby the apparatus is adapted particularly for use with aircraft and the like high-speed devices generating substantial acceleration forces.

The stable element of the invention is characterized still further by a simple and efficient design and construction, whereby the apparatus is free from complicated and cumbersome controls and adjustments, and is adapted to widely varying uses, including those requiring extremely compact and economical instrumentation.

The invention will be better understood by reference to the following description taken in conjunction with the accompanying drawings, in which:

Fig. 1 is a top plan of the apparatus with the jet unit removed;

Fig. 2 is a side view, partly in section, and with the case and gimbal frame removed;

Fig. 3 is a section along the line 3—3 of Fig. 2;

Fig. 4 is a perspective of one of the gyro units; and

Fig. 5 is an enlarged sectional view of one of the pneumatic pick up units.

Generally considered, the stable element of the invention comprises a horizon defining mass, herein termed a reference platform, which is universally supported, or more particularly suspended for freedom of movement about two perpendicular axes, as for example the roll and pitch axes of a sea or air craft. This horizon defining platform is characterized further as a rigid body which is non-pendulous, or statically balanced on its universal support. Two gyroscope assemblies are constructed and arranged on the platform to produce torques about their vertical or suspension axes responsive and in proportion to drift, tilt, or angular velocity of the platform about said perpendicular or roll and pitch axes. The platform additionally mounts an erecting or leveling system including a self-contained fluid pressure supplying means; detector-controller devices for converting the gyro torques to differential fluid pressures; and a fluid pressure driven, detector-controller regulated, reaction motor operable independent of the stable element support to effect a thrust or torque counteracting and nulling drift such as referred to. In order that the position in which the platform is thus held stabilized may be truly horizontal (or vertical) pendulous control means are provided whereby the gyro elements may be gravity influenced with respect to their reaction to platform rotation about the aforementioned roll and pitch axes. The stable element control system includes in addition remotely controllable, platform mounted, torque providing means for precessing the gyros to correct or compensate for movement of the stable element carrying body relative to the earth, and for motion of the earth in space. The reference platform incorporates still further a center of gravity shifting device whereby the platform itself is made pendulous or bottom heavy under predetermined conditions. The apparatus of the invention also includes self-synchronous means for continuously measuring, indicating and transmitting to a remote station the angular displacement of the reference platform from the stable element carrying body or aircraft about said roll and pitch axes.

Referring now more particularly to Fig. 1, the stable element of the invention is there shown to comprise in a preferred embodiment a non-pendulous rigid mass including an artificial horizon or reference platform 10 statically balanced on a universal support or gimbal suspension 11 having the axes AA, BB, and supported in the frame 9. As will be more fully apparent hereinafter, the entire control and erection system for the artificial horizon is mounted on and may be said to form a unitary assembly with this supporting platform or block 10, which may have any design or configuration convenient thereto. The terms "artificial horizon" and "reference platform" will therefore be understood to refer generally to the entire gimbal mounted assembly and more specifically to a lateral or horizontal section through the block 10.

The horizon defining means of the invention, then, has universal freedom of rotation; accordingly, its attitude or inclination is unaffected by and independent of the rotation or tilt of the stable element carrying body.

In further accordance with the invention, gimbal suspension 11 is arranged with its axes AA, BB aligned with the major and minor axes of the stable element carrying body, as for example the roll and pitch axes of an aircraft. Rotation of universally supported, artificial horizon defining, reference platform 10 is thus seen to result largely from forces acting about, and its attitude or inclination relative to its support to have components measurable about the aforesaid perpendicular major and minor or roll and pitch axes AA, BB. Such forces are minimized, as contemplated by the invention, in that this artificial horizon defining assembly is non-pendulous or statically balanced in the gimbal suspension 11. Stated more particularly, it is constructed and arranged to have its center of gravity coincident with the intersection of its axes of rotation AA, BB. It will be readily appreciated, moreover, that the reference platform proper is non-gyroscopic or free from angular momentum such as characterizes a rapidly spinning mass or body. The horizon defining means of the present invention is therefore free from the direct influence of gravitational and acceleration forces, and drifts or tilts responsive merely and solely to relatively small and readily controlled spurious torques which may be considered to act about the roll and pitch axes AA, BB.

The platform tilt or rotation detecting means of the invention is seen from Figs. 1 and 4 to comprise two identical rate responsive gyroscopes 20A, 20B suitably arranged at one side of the platform 10 each comprising a rotor of conventional construction (and therefore not shown) which may be electrically spun in known manner by and in a stator or casing 21. As shown more particularly in Fig. 4, the gyros 20A, 20B are supported by suspension on a torsionless wire 12, and by radial capture at upper and lower cylindrical casing portions 21a, 21b in mating, coaxial, ball bearings 13, 14. In further accordance with the invention, the gyros are positioned or oriented such that gyro 20A normally lies with its spin axis ZA, ZA paralleling pitch axis BB, and such that gyro 20B in the similar normal or at rest condition spins about an axis ZB, ZB which is perpendicular to spin axis ZA, ZA or paralleling roll axis AA.

In accordance with the invention, then, the gyro rotors are free to move relative to the platform 10 about their spin axes ZA, ZA, ZB, ZB and about their suspension axes YY. The gyro stators or casings 21, on the other hand, are fixed for movement with the platform about the spin axes ZA, ZA, ZB, ZB and the horizontal axes XA, XA, XB, XB normal thereto, and have freedom of movement relative to the remainder of the horizon defining assembly only about the suspension axes YY.

Referring again to Fig. 4, the gyro support is seen to comprise in addition to the wire 12 a stop means or bumper screw 15 which may be fixed in any convenient manner on the platform 10 beneath and for adjustment vertically of the gyro casing 21. It will be readily apparent that in the event of sudden and severe downward acceleration of the stable element carrying body, such as to cause temporary elongation of the wire 12, the stop 15 serves to hold the stress in the wire within safe limits by engagement with the base of the gyro stud shaft 22.

It will be recalled that the gyroscopic platform rotation detecting means of the invention are arranged so that the spin axis ZA, ZA of gyro element 20A parallels pitch axis BB, and the spin axis ZB, ZB of gyro element 20B parallels roll axis AA. It follows that the one gyroscope 20A is constructed and arranged to effect a torque about its suspension axis YY responsive and proportional to rate of drift or tilt of the horizon defining assembly about the roll axis AA; and, similarly, that the other gyroscope 20B will produce a torque about its suspension axis YY responsive and proportional to rate of angular movement of the platform 10 about the pitch axis BB. Moreover, and as will be readily apparent to those skilled in the art, the gyro elements 20A, 20B are sensitive to extremely small, well nigh incipient forces about the mentioned roll and pitch axes AA, BB in that the low torsion gradient strand 12 and the load-free ball bearing assemblies 13, 14 provide substantially frictionless bearing support.

The stable element control means thus far described are seen to function merely to fix the platform 10 in its initially assumed or starting position. The gyro vertical of the invention, however, will be understood to measure the angle as well as the rate of movement (of platform 10) about the horizontal axes AA, BB. Thus, and in order that the reference platform may seek a truly horizontal position, pendulous control means are provided whereby the gyros 20A, 20B are gravity influenced in their normal operation. Such means are seen from Figs. 1 and 5 to comprise masses or weights 24 which are supported on the gyro casings 21 and more particularly laterally offset from the vertical gyro axes YY on tapered pins 25 mounted on the vane forming plates 23.

In accordance with the invention, the arrangement or orientation of the pendulous control means 24 on the gyros 20A, 20B is predeterminedly such as to effect no torques about the gyro suspension axes YY when the gyros are either vertical or tilted about their respective spin axes ZA, ZA, ZB, ZB. To this end the one mass 24 is seen from Fig. 1 to be offset along the roll-axis-paralleling axis XA, XA of gyro 20A and the other mass 24 to be offset at right angles, or along the pitch-axis-paralleling axis XB, XB of gyro 20B. The gyros 20A, 20B are therefore gravity influenced only with respect to platform tilt about their axes XA, XA, XB, XB, which, as earlier described, are coincident respectively with the roll and pitch axes AA, BB. Accordingly, the effect of the pendulous gyro control means is to require that the platform 10 assume a truly vertical position about one or the roll axis with respect to gyro 20A, and about a perpendicular or the pitch axis with respect to gyro 20B for non-governing or at rest condition of the reference platform leveling system as hereinafter described.

It will be readily appreciated by those skilled in the art that by reason of the indicated choice or selection of gyro suspension and spin axes that the torque due to gyro rate and the torque due to pendulum angle are in the apparatus of the invention directly additive. In other words the pendulous control means or weights 24 are attached directly to the gyros, without the usual error inducing, connecting linkage, and also without making the reference platform, as a whole, pendulous.

The development of torques by the gyros 20A, 20B responsive as described to rotation of the platform 10 actuates the artificial horizon erecting or leveling means now to be described. The platform drift nulling means of the invention is seen from Figs. 1 and 2 to comprise a fluid pressure jet reaction system including a centrifugal fluid pressure supplying means, blower, or pump 16 of conventional construction rigidly fixed on the platform 10. The reference platform of the present invention has earlier been described as not directly subject to pendulum or gyroscope influence. Thus and in accordance with the invention the pump 16 is positioned as required for static balance of the platform 10 in its gimbal suspension 11, and further is oriented at 45° to each of the gyros 20A, 20B, as clearly shown in Fig. 1, whereby the sum of the gyroscopic momentum of the three motors 16, 20A, 20B is zero.

The platform drift reflecting gyro torques are applied to this leveling system and more particularly converted to differential fluid pressures by means of the detector controller units or gyro pick-offs 30, 30 indicated in Fig. 1 and shown more particularly in Figs. 4 and 5. These torque converting units 30 are seen generally to be fixed on the platform 10 adjacent the gyro casings 21, and more particularly to comprise each a pair of aligned and juxtaposed blocks 31a, 31b, having axial bores 32a, 32b joined by transverse or lateral passages 33a, 33b and 34a, 34b. The bores 32a, 32b are plugged by screw threaded members 35a, 35b having aligned infacing axial passages 36a, 36b which are inwardly expanded as shown to form mating, opposed cup sections 37a, 37b. In accordance with the invention, the axial passages 36a, 36b are joined to the lateral passages 33a, 33b, 34a, 34b by reduced lateral plug passages predeterminedly forming restrictions 38a, 38b, 39a, 39b, as clearly shown in Fig. 5.

Referring again to Fig. 5, the detector controller units or gyro pick-offs 30 are seen further to comprise laterally extending torque arms, flappers or vanes 23 which are rigidly mounted on the casings 21 to project between the blocks 31a, 31b and to present vertical faces juxtaposed to and normally equidistant from the cups 37a, 37b. Stated more particularly, under platform-stilled or non-governing conditions the gyro-mounted vanes 23 are oriented to bisect the relatively small interval or gap between opposed cup pairs 37a, 37b. And upon the development of the described platform drift responsive gyro torques, one or both of the vanes 23 is urged toward and a like distance away from one and the other cup of its respective pair. Accordingly, the drift nulling fluid pressure system of the invention is characterized at the detector-controller assemblies 30 by like pairs of variable orifices, and further by similar or parallel differential pressure defining means, in that the orifices defined by the gyro carried vanes and their associated cup pairs are inversely variable.

In further accordance with the invention the pressure fluid supplied by the pump 16 is carried to the detector controllers 30 in any convenient manner, as through parallel pump communicating supply passages (not shown), and is there fed into the block passages 33a, 33b. The pressure fluid, generally air, is then passed through the smaller fixed restrictions 38a, 38b into the plug passages or chambers 36a, 36b. There is a continual discharge of the pressure fluid or air from these pick off chambers through the variable restrictions defined by the cups 37a, 37b and movable vanes 23, Fig. 5. The air pressures in the chambers 36a, 36b and therefore the pressures in the connecting passages 34a, 34b are seen to be varied and more particularly inversely varied by the described movement of the vane 23 a like distance toward and away from one and the other of the cups 37a, 37b and as influenced by the platform-rotation-responsive gyro torques.

It will be understood from the foregoing that the operation of the gyro pick-offs 30 is characterized further by a floating or balance of the vanes 23 between equal and opposite air streams discharged through identical opposed pick-off nozzle structures, and that movement of the vanes effects differential or more particularly inversely varying pressures in the pick-off discharge passages 34a, 34b, Fig. 5. For example, a counter-clockwise torque produced about the suspension axis YY of gyro 20 will rotate its vane 23 to the left, as viewed in Figs. 4 and 5, and will simultaneously increase and decrease the leakage or flow through the cups 37a, 37b respectively. As the cups are supplied from similar restrictions 38a, 38b, the pressures in cups 37a, 37b, and in the plug chambers 36a, 36b, will simultaneously and correspondingly decrease and increase due to this decrease and increase in cup flow and as measured by the accompanying proportional increase and decrease in the pressure drop across the restrictions 38a, 38b. The resultant differential pressures are applied to the fluid pressure jet reaction system through the pick-off discharge passages 34a, 34b already described.

It will be readily appreciated that the described differential pressure in a pick-off nozzle pair 30 produces a pneumatic torque equal to the gyro torque at the vane 23, and that such pneumatic torque is the product of the differential pressure in, the distance to, and the area of the cup pair 37a, 37b. This differential pressure is seen to vary or more particularly increase with the movement of the vane from the intermediate position to counterbalance the gyro torque.

The gyro torque converting means of the invention are further characterized in that an extremely small movement of the vanes 23 suffices to effect a pressure differential which counterbalances the gyro torques, stills the vanes, and brings the mechanism into the mentioned equilibrium. And as will be readily appreciated by those skilled in the art, the described double acting or balanced arrangement of the vanes is highly advantageous in that the vanes are not loaded or tensioned, and therefore not affected by spring constants, and are substantially frictionless in action. In addition, the differential pressure is found to be linearly proportional to the vane-cup distance over a considerable range of pressures, and the sensitivity of the instrument, or the slope of the curve relating the differential pressure to the vane position, can be varied for any given pressure by changing the initial clearance between the vanes and the cups.

The reference platform leveling system of the invention further comprises a fluid pressure driven, pick-off controlled, drift nulling jet reaction motor 40. As clearly shown in Figs. 2 and 3, this jet servo unit or reaction motor 40 includes a centrally apertured base plate 41 having four equidistant annular depressions or diaphragm cavities 41a, 41b in its upper face. The cavities 41a, 41b are seen to receive diaphragms 42a, 42b which may be relatively rigid in an annular central part and which are sealed to the cavity walls at a flexible annular peripheral part. The base plate 41 is surmounted by a cap plate 43 having a seat-forming annular flange 43a, and is spanned outwardly thereof by a bracket or bridge 44 supporting centrally a downfacing bearing stud 44a. An annular dished element or dome 45 is inverted and centered over the plate 43, and is proportioned to have its peripheral margin 45a overlying the seat 43a, as shown. The dome 45 is formed centrally with an annular U-section recess 45b in its upper face receiving the bearing stud 44a. The disposition and arrangement of plate 43, stud 44a, and dome 45 is seen to be such as to permit the dome 45 to "rock" freely about the stud 44a, and to provide, when the dome 45 occupies the operative or pressure supported, balanced position of Fig. 2 a relatively small circumferential crack or orifice between the peripheral margin 45a of dome 45 and the flange or seat 43a. A considerable volume of the hereinbefore mentioned pressure fluid or air is supplied direct to jet reaction motor 40 by the pump 16 through a relatively large diametered connecting tube or passage 16a (Fig. 2) joining base plate 41 at a central aperture thereof. This pressurized air is seen to escape to atmosphere through the described variable reaction motor orifice, which is positioned and oriented, as indicated in Fig. 2, at maximum distance from the gimbal axes AA, BB, and so as to direct its pressure discharge laterally of the platform structure, whereby to provide the maximum desired torque on the platform and about the aforesaid axes of platform rotation AA, BB.

Referring again to Fig. 2, the dome 45 is seen to be tilted or rocked about the bearing 44a by fluctuation or more particularly vertical displacement of the diaphragms 42a, 42b acting through the thrust elements or wires 46. In accordance with the invention this vertical diaphragm displacement is produced or governed by the differential pressures effected at the detector controller units 30 and conducted from the relatively small diametered passages 34a, 34b by any convenient means including base plate passages as at 41c, 41d to the proper diaphragm cavities 41a, 41b. It will be understood that the cavities proper or corresponding to each pick-off 30 are opposed, or oppositely located on the servomotor 40. In other words, the differential pressures reflecting the torques developed by gyro 20A are communicated to the one set of diaphragms 42a, 42b, and those responsive to movement of gyro 20B are effective at the other and opposite set of diaphragms 42a, 42b. It will be understood further that jet servo 40 is shown in Fig. 2 in the position it would occupy should all the input differential pressures be zero. Under such condition, and such condition only, the orifice is of uniform area around the entire periphery and the jet reaction of the escaping air is symmetrical, or such as to develop no or zero jet reaction force.

In operation, as hereinbefore pointed out, the artificial horizon of the invention may be subject to relatively large spurious torques which may be said to act about the roll and pitch axes AA, BB. These torques may develop in the hereinbefore described bearings by which the horizon defining reference platform of the invention is supported for universal freedom of rotation, as from frictional resistance to movement of the universal support relative to said platform. Or they may result from any shift of the stable element parts which upsets the balance of the platform 10 in the gimbal suspension 11. Or they may be produced by windage, or motion of the ambient air. These torques are seen to initiate a drift or tilt of the platform about the axes AA, BB whose direction and rate is accurately reflected in and by the direction and distance of the movement of the vanes 23 carried by and rotating with the rate responsive gyros 20A, 20B. The vane movement resulting from this drift of the platform 10 from its established or fixed position produces the described proportional pressure differentials in the pickoffs 30, upsets the balance of the dome 45 on the pilot 44a by reason of the influence of the differential pressures on the diaphragms 42, and causes an unequal distribution of the relatively large volume of pressurized air supplied to and escaping from reaction motor 40 in the manner described. There results, in other words, a non-symmetrical or directional jet thrust from the servomotor 40. It will be understood that the servo diaphragms are predeterminedly so placed as to produce a jet thrust in a direction opposite to, or counteracting and nulling the drift-effecting frictional, gravitational, and windage torques acting about the axes AA, BB. It will be apparent also that a drift nulling jet reaction torque is produced substantially instantaneously by the herein described gyro-pneumatic control and stabilizing system, and that the artificial horizon provided by the apparatus of the invention is therefore extraordinarily steady or non-oscillating, and also susbtantially free from the effects of motion in space.

It will be understood that under conditions of rapid angular movement of the vertical carrying body, as obtaining for example during turns in aircraft maneuver, the pendulous control means 24 are subject so spurious torques caused by the resulting acceleration forces. In accordance with the invention, remotely controlled means are provided for predeterminedly inactivating or disconnecting the pendulums during such maneuver. Such means are indicated in Fig. 4 as a platform mounted solenoid 26 which may be energized to lift the weight 24 from its supporting pin 25 through the medium of the forked arm 27. The solenoid 26 is conveniently controlled by a conventional pendulum removing switch located remote from the platform 10 (and therefore not shown).

Means are provided by the invention for compensating or correcting the gyro vertical for movement of the earth and the vertical carrying body in space. When the pendulums 24 are removed or rendered inoperative, the platform 10 has an attitude or position which is not related to the earth's horizon but rather fixed in space. As generally appreciated, due to the rotation of the earth, any body or surface which is fixed in space will appear to observers on the earth to tilt or tip as the earth rotates. For example, if the aircraft or other stable element carrying body were stationary in space, such body, and hence the reference platform 10 would appear to have inverted itself, or turned upside down, in a twelve-hour period. On the other hand, if the aircraft is moving at the speed of the earth but in the opposite direction the platform will be found to remain horizontal with respect to the earth. The stable element of the invention is corrected for these earth and aircraft movements by means of electromagnetic gyro precessing torque units 50 shown in Fig. 4 as each comprising a platform mounted sleeve 51 encircling and concentric with the gyro stud shaft 22 and mounting the coils 52. The coils are supplied from a remote earth's-speed-own speed computer resolving as conventional, the speed, heading and latitude of the aircraft with respect to the earth. The desired torque as for precessing each of the gyros 20A, 20B is seen to be produced by the reaction of the coil current on the magnetic field of a permanent magnet 53 fixed on the gyro stud shaft 22.

As heretofore described the platform 10 proper is non-pendulous, or statically balanced in the gimbal suspension 11, and therefore not, in and of itself, vertical seeking. Moreover, a brief but measurable interval is required for the gyros, when initially energized, to come up to speed. Accordingly, means are provided by the invention for reducing the vertical-finding or erection time following start up of the apparatus. Such means comprise in a presently preferred embodiment a center of gravity shifting element or weight 17 shown in Fig. 2 as attached to the underside of the platform 10 and more particularly vertically slidable in a cylinder 18 under the influence of air pressure supplied by the pump 16, which is seen to be connected to the cylinder 18 by the passage 19. It will be understood that when the stable element is not operating the weight 17 lies at the bottom of cylinder 18, under which condition the platform 10 is bottom heavy and therefore pendulous or vertical seeking. Thus when the apparatus is started up, and the weight 18 is driven by the air pressure from the blower 16 through the position indicated in Fig. 2 to its uppermost position, shifting the center of gravity of the platform to its normal coincidence with the gimbal axes AA, BB, the platform is already or initially fixed in a substantially horizontal position.

The frictionless means provided by the invention for measuring the angular displacement between the platform 10 and the gyro vertical carrying body about the roll and pitch axes AA, BB, are seen from Fig. 1 to include selsyn type units 60a, 60b mounted on the frame 9 and gimbal suspension 11 respectively. The electrical output from the selsyns is conducted by means of the slip ring assemblies 61a, 61b to a remote position or external panel (not shown) where the angles may be reproduced by servo units connected to null the voltages from the selsyns.

The apparatus of the invention is kept free from foreign matter, moisture, and the like by enclosing and sealing the entire mechanism in a rigid case 70, Fig. 1, which may be pressurized to the desired value before sealing. It will be readily appreciated that the described sealed enclosure of the gyro vertical provides a constant uniform dirt and moisture free air supply for recycling through the described fluid pressure system, and that the platform 10 is thus completely insulated from the effects of ambient air currents external to the apparatus.

From the foregoing it will be apparent that the present invention provides a new and improved gyro vertical which is simple and efficient in design and construction and sensitive and stable in operation. The artificial horizon or reference of the invention has been shown further to be pendulum- and gyro-controlled, and yet free from the numerous errors and complicated control circuits heretofore characterizing and required for pendulous gyro verticals.

Our invention is not limited to the particular embodiments thereof illustrated and described herein, and we set forth its scope in our following claims.

We claim:

1. An artificial horizon comprising a universal support, a rigid mass statically balanced on said support, gyroscopic means carried by and measuring rotation of said mass, and gyro-controlled torque developing means on said mass acting independent of said support to still said rotation, said gyroscopic and gyro-controlled means constructed and arranged to impart zero net gyroscopic momentum to said mass.

2. An artificial horizon comprising a universal support, a rigid mass statically balanced on said support, gyroscopic means carried by and measuring rotation of said mass, gyro-controlled torque developing means on said mass acting independent of said support to still said rotation, and pendulous means having rigid support on and influencing said gyroscopic means to signal departure and order return of said mass from and to a horizontal position.

3. An artificial horizon comprising a universal support, a rigid mass statically balanced on said support, gyroscopic means carried by and measuring rotation of said mass, gyro-controlled torque developing means on said mass acting independent of said support to still said rotation, said gyroscopic and gyro-controlled means constructed and arranged to impart zero net gyroscopic momentum to said mass, and means for rendering said mass pendulous upon and during inactivation of said gyroscopic means.

4. An artificial horizon comprising a universal support, a rigid mass statically balanced on said support, gyroscopic means carried by and measuring rotation of said mass, gyro-controlled torque developing means on said mass acting independent of said support to still said rotation, and means compensating said gyroscopic means for movement of said support, said gyroscopic and gyro-controlled means constructed and arranged to impart zero net gyroscopic momentum to said mass.

5. An artificial horizon comprising a universal support, a rigid mass statically balanced on said support, gyroscopic means carried by and measuring rotation of said mass, gyro-controlled torque developing means on said mass acting independent of said support to still said rotation, said gyroscopic and gyro-controlled means constructed and arranged to impart zero net gyroscopic momentum to said mass, and means for measuring, indicating, and transmitting to a remote station the angular displacement of said mass from said support.

6. An artificial horizon comprising a universal support, a rigid mass statically balanced on said support, gyroscopic, pendulous means measuring and adding directly rate and angle torques on said mass, gyro-controlled torque developing means acting independent of said support to still rotation of said mass, and means completely enclosing and pressure sealing said support and said mass.

7. An artificial horizon comprising a universal support, a rigid mass statically balanced on said support, gyroscopic means carried by and measuring rotation of said mass, gyro-controlled torque developing means on said mass acting independent of said support to still said rotation, pendulous means supported on and influencing said gyroscopic means to signal departure and order return of said mass from and to a horizontal position, and means for rendering said mass pendulous upon and during inactivation of said gyroscopic means.

8. An artificial horizon comprising a universal support, a rigid mass statically balanced on said support, gyroscopic means carried by and measuring rotation of said mass, gyro-controlled torque developing means on said mass acting independent of said support to still said rotation, pendulous means supported on and influencing said gyroscopic means to signal departure and order return of said mass from and to a horizontal position, means for rendering said mass pendulous upon and during inactivation of said gyroscopic means, and means compensating said gyroscopic means for movement of said support.

9. An artificial horizon comprising a universal support, a rigid mass statically balanced on said support, gyroscopic means carried by and measuring rotation of said mass, gyro-controlled torque developing means on said mass acting independent of said support to still said rotation, pendulous means supported on and influencing said gyroscopic means to signal departure and order return of said mass from and to a horizontal position, means for rendering said mass pendulous upon and during inactivation of said gyroscopic means, means compensating said gyroscopic means for movement of said support, and means for measuring, indicating, and transmitting to a remote station the angular displacement of said mass from said support.

10. An artificial horizon comprising a universal support, a rigid mass statically balanced on said support, gyroscopic means carried by and measuring rotation of said mass, gyro-controlled torque developing means on said mass acting independent of said support to still said rotation, pendulous means supported on and influencing said gyroscopic means to signal departure and order return of said mass from and to a horizontal position, means for rendering said mass pendulous upon and during inactivation of said gyroscopic means for movement of said support, means for measuring, indicating, and transmitting to a remote station the angular displacement of said mass from said support, and means completely enclosing and vacuum sealing said support and said mass.

11. An artificial horizon comprising a universal support, a rigid mass statically balanced on said support, gyroscopic means carried by and measuring rotation of said mass, gyro-controlled torque developing means on said mass acting independent of said support to still said rotation, pendulous means having rigid support on and influencing said gyroscopic means to signal departure and order return of said mass from and to a horizontal position, and means compensating said gyroscopic means for movement of said support.

12. An artificial horizon comprising a universal support, a rigid mass statically balanced on said support, gyroscopic means carried by and measuring rotation of said mass, gyro-controlled torque developing means on said mass acting independent of said support to still said rotation, pendulous means having rigid support on and influencing said gyroscopic means to signal departure and order return of said mass from and to a horizontal position, means compensating said gyroscopic means for movement of said support, and means for measuring, indicating, and transmitting to a remote station the angular displacement of said mass from said support.

13. A new and improved stable element comprising, in combination, a universal support, a platform statically balanced on said support, gyroscopic elements supported on said platform and sensing and signalling its rotational change of position, and element signal controlled means carried by said platform and operable independent of said support to still said rotation, said elements and means constructed and arranged to impart zero net gyroscopic momentum to said platform.

14. A stable element according to claim 13, and means controlling said gyroscopic elements for response to rotation of said platform from and for ordering its return to a horizontal position.

15. A stable element according to claim 13, and means controlling said gyroscopic elements for response to rotation of said platform from and for ordering its return to a horizontal position, means compensating said gyroscopic elements for spatial movement of said support, and means for indicating the angular displacement of said platform from said support.

16. An artificial horizon comprising a universal support, a reference platform statically balanced on said support and rotatable subject only to spurious torques acting about mutually perpendicular axes, a pair of rate responsive gyros each constructed and arranged on said platform for sensing and signalling platform rotation about one of said axes, and gyro signal controlled means carried by said platform and counteracting said torques, said gyros and means constructed and arranged to impart zero net gyroscopic momentum to said platform.

17. An artificial horizon according to claim 16, and pendulous means rigid and moving only with said gyros to measure departure and order return of said platform from and to a horizontal position.

18. An artificial horizon according to claim 16, and means for precessing said gyros to compensate for spatial movement of said support.

19. An artificial horizon according to claim 16, and means for measuring, indicating, and transmitting to a remote station the angular displacement of said platform from said support.

20. An artificial horizon comprising a universal support, a reference platform statically balanced on said support and rotatable subject only to spurious torques acting about mutually perpendicular axes, a pair of rate responsive gyros each constructed and arranged on said platform for sensing and signalling platform rotation about one of said axes, gyro signal controlled means carried by said platform and counteracting said torques, pendulous means influencing said gyros to measure departure and order return of said platform from and to a horizontal position, and means for precessing said gyros to compensate for spatial movement of said support.

21. An artificial horizon comprising a universal support, a reference platform statically balanced on said support and rotatable subject only to spurious torques acting about mutually perpendicular axes, a pair of rate responsive gyros each constructed and arranged on said platform for sensing and signalling platform rotation about one of said axes, gyro signal controlled means carried by said platform and counteracting said torques, pendulous means influencing said gyros to measure departure and order return of said platform from and to a horizontal position, means for precessing said gyros to compensate for spatial movement of said support, and means for measuring, indicating, and transmitting to a remote station the angular displacement of said platform from said support.

22. A new and improved stable element comprising a support; a platform statically balanced and universally rotatable on said support subject only to spurious torques acting about mutually perpendicular axes; a pair of rate responsive gyros constructed and arranged on said platform to measure rotation about one and the other of said perpendicular platform axes and to develop torques about their suspension axes responsive and proportional to said spurious torques; and platform erecting means including a differential pressure actuated jet reaction device, a pneumatic system supplying said device, and means for converting the gyro torques to differential pressures in said system, said gyros and pneumatic system constructed and arranged to impart zero net gyroscopic momentum to said platform.

23. In a gyro vertical, in combination, a universal support, a reference mass statically balanced on said support, gyroscopic, pendulous means measuring and directly summarizing rate and angle torques on said mass, and means for stilling rotation of said mass comprising a differential pressure actuated torque motor, a self contained source of fluid pressure, a fluid circuit coupling said source to said motor, and means controlled by said measuring means for developing differential pressures in said circuit.

24. An artificial horizon according to claim 23, wherein said differential pressures developing means comprise opposed nozzles supplied from parallel branches of said circuit, and baffle means carried by said gyroscopic means and balanced between the discharge from said nozzles.

25. In an artificial horizon, a universal support, a reference platform statically balanced on said support, gyroscopic, pendulous means constructed and arranged for measuring and directly summarizing rate and angle torques on said platform and means for erecting said platform comprising a source of fluid pressure, a fluid circuit having parallel branches supplied from said source and presenting aligned opposed orifices, baffle means carried by said gyroscopic means and floating in and balanced by the jet discharge through said orifices, and a jet servo motor supplied from said source and developing a thrust having a net force and direction determined by the differential pressures resultant in said circuit.

26. A stable element according to claim 25 wherein said servo motor comprises means providing an annular seat, a mating annular member centrally pivotally supported over and closely spaced from said seat, said seat and said member defining therebetween a fluid chamber having a circumferential orifice, and means governed by said differential pressures for rocking said mating member.

27. A new and improved stable element comprising a universal support, a rigid mass statically balanced on said support, a pair of rate responsive gyros constructed and arranged on said mass to effect torques about their suspension axes responsive and proportional to movement of said mass from a horizontal position and about mutually perpendicular axes, and a gyro controlled system for nulling said rotation, including a fluid circuit, a differential pressure actuated torque motor, self-contained means supplying pressure fluid to said motor and to said circuit, and means for converting said gyro torques to differential pressures in said circuit, said gyros and pressure fluid supplying means constructed and arranged to impart zero net gyroscopic momentum to said mass.

28. An artificial horizon comprising a supporting frame, a reference platform statically balanced and universally rotatable in said frame, gyroscopic means carried by and measuring the rotation of said platform, and gyro controlled torque developing means on said platform acting independent of said frame to still said rotation, said gyroscopic and gyro-controlled means constructed and arranged to impart zero net gyroscopic momentum to said platform.

29. An artificial horizon comprising a supporting frame, a platform statically balanced and universally rotatable in said frame, a pair of rate responsive gyros fixed on said platform and measuring its rotation about mutually perpendicular axes, a pair of pendulum weights each supported directly on one of said gyros and positioned so that said gyros measure and add directly rate and angle torques on said platform, and a torque motor controlled by said gyros and acting independent of said frame to erect said platform.

30. An artificial horizon according to claim 29, and remote control means for removing said weights.

31. An artificial horizon comprising a universal support, a rigid mass statically balanced on said support, pendulum supporting, gyroscopic means for measuring and adding directly rate and angle torques on said mass, and means controlled by said first mentioned means for stilling rotation of said mass, said gyroscopic and gyro-controlled means constructed and arranged to impart zero net gyroscopic momentum to said mass.

References Cited in the file of this patent

UNITED STATES PATENTS

| | | |
|---|---|---|
| 1,324,477 | Tanner | Dec. 9, 1919 |
| 1,501,886 | Abbot | July 15, 1924 |
| 1,887,335 | Sperry | Nov. 8, 1932 |
| 2,129,586 | Moller | Sept. 6, 1938 |
| 2,295,158 | Carter | Sept. 8, 1942 |
| 2,297,274 | Wunsch | Sept. 29, 1942 |
| 2,411,087 | Ford | Nov. 12, 1946 |
| 2,603,003 | Braddon | July 15, 1952 |
| 2,606,448 | Norden et al. | Aug. 12, 1952 |
| 2,631,455 | Wing | Mar. 17, 1953 |

FOREIGN PATENTS

| | | |
|---|---|---|
| 695,683 | Germany | Aug. 30, 1940 |